(12) United States Patent

Fermigier et al.

(10) Patent No.: US 12,625,392 B2

(45) Date of Patent: May 12, 2026

(54) DYNAMIC CONTROL OF TRANSMISSION VALUE

(71) Applicant: Essilor International, Charenton-le-Pont (FR)

(72) Inventors: Bruno Fermigier, Charenton-le-Pont (FR); Cédric Gilbert, Charenton-le-Pont (FR); Alexandre Gourraud, Charenton-le-Pont (FR); Marius Peloux, Charenton-le-Pont (FR); Vincent Roptin, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 926 days.

(21) Appl. No.: 17/770,468

(22) PCT Filed: Oct. 14, 2021

(86) PCT No.: PCT/EP2021/078518

§ 371 (c)(1),
(2) Date: Apr. 20, 2022

(87) PCT Pub. No.: WO2022/079200

PCT Pub. Date: Apr. 21, 2022

(65) Prior Publication Data

US 2022/0397777 A1 Dec. 15, 2022

(30) Foreign Application Priority Data

Oct. 16, 2020 (EP) .................................... 20306224

(51) Int. Cl.
*G02C 7/10* (2006.01)
(52) U.S. Cl.
CPC .................................. *G02C 7/101* (2013.01)

(58) Field of Classification Search
None
See application file for complete search history.

(56) References Cited

U.S. PATENT DOCUMENTS

| 2002/0044112 A1 | 4/2002 | Gross et al. |
| 2005/0253793 A1* | 11/2005 | Chien .................. G09G 3/3648 |
| | | 345/87 |

(Continued)

FOREIGN PATENT DOCUMENTS

| CN | 111279249 A | 6/2020 |
| CN | 111474797 A | 7/2020 |

(Continued)

OTHER PUBLICATIONS

International Search Report and Written Opinion issued Feb. 8, 2022 in PCT/EP2021/078518 filed on Oct. 14, 2021, citing documents AA-AI & AO-AP therein, 12 pages.

(Continued)

*Primary Examiner* — Joseph R Haley
(74) *Attorney, Agent, or Firm* — Oblon, McClelland, Maier & Neustadt, L.L.P.

(57) ABSTRACT

The disclosure relates to methods, controlling units, eyeglasses, computer programs and computer-readable storage media for controlling an optical transmission of a variable transmission ophthalmic lens. The method includes receiving from a light sensor a measured illuminance of the environment of a wearer, computing a change of illuminance measured during a predetermined time interval, comparing the computed change of illuminance with a first threshold, when the computed change of illuminance is greater than the first threshold, implementing first command configured for varying the transmission of the variable transmission ophthalmic lens from initial transmission value corresponding to a current transmission value to a first target transmission value, according to a first variation profile comprising a first (Continued)

phase during which the transmission overshoots the first target transmission value, and a second phase during which the transmission returns to the first target transmission value.

11 Claims, 3 Drawing Sheets

(56)  References Cited

U.S. PATENT DOCUMENTS

| | | |
|---|---|---|
| 2015/0062469 A1 | 3/2015 | Fleury |
| 2017/0199396 A1 | 7/2017 | Knoll |
| 2018/0107025 A1 | 4/2018 | Smit et al. |
| 2018/0210236 A1 | 7/2018 | Peloux et al. |
| 2019/0219844 A1 | 7/2019 | Knoll |
| 2019/0391413 A1 | 12/2019 | Knoll |

| | | | |
|---|---|---|---|
| 2020/0192124 A1 | 6/2020 | Knoll | |
| 2020/0251070 A1 * | 8/2020 | Park | G02B 27/01 |
| 2021/0033891 A1 | 2/2021 | Peloux | |

FOREIGN PATENT DOCUMENTS

| | | |
|---|---|---|
| CN | 111670405 A | 9/2020 |
| EP | 3 521 910 A1 | 8/2019 |
| JP | 2004-245985 A | 9/2004 |
| WO | WO 2017/009544 A1 | 1/2017 |

OTHER PUBLICATIONS

Extended European Search Report and Written Opinion issued Apr. 22, 2021 in European Application 20306224.5 filed on Oct. 16, 2020, citing documents AA-AI & AO-AP therein, 10 pages.

\* cited by examiner

DYNAMIC CONTROL OF TRANSMISSION VALUE

FIELD OF THE INVENTION

The present invention relates to a method for controlling the optical transmission of variable transmission ophthalmic lenses.

BACKGROUND OF THE INVENTION

As known from the person skilled in the art, variable transmission ophthalmic lenses enable to limit the glare discomfort while preserving vision performance.

Variable transmission ophthalmic lenses may comprise, for example, a layer of electrochromics, or a layer of liquid crystals, controlled to modify the optical transmission of the lens upon detection of variations of the light environment of the wearer. Typically, the brighter the environment (E, in lux for instance) becomes, the darker the lenses should be tinted, i.e. the less optical transmission they have, and conversely.

Variable transmission lenses are typically controlled to adapt their transmission when a change of illuminance of the environment has been detected and the transmission set is determined as a function of the illuminance measured after the detection of the change of illuminance.

Practically, light environment can vary from some lux decades (rather dark inside) to some k.lux decades (bright outside)—not mentioning condition that would correspond to night vision. That means that a ratio around 1000 in some extreme cases, and some ratio of more than 100 ordinarily will characterize the light environment variations experienced by wearers.

Considering electrochromic lenses, their transmission may vary between 90% and 10% for class 3 eyewear and between 90% and 4% for class 4 eyewear. The corresponding attenuation factor is thus respectively of 9 (90/10) and 22.5 (90/4).

It is thus not possible to sufficiently attenuate the variations of the luminous environment of the wearer to keep a substantially constant level of light perceived by the wearer during those variations. This might result in a discomfort of the wearer while the transmission of the variable transmission lens varies.

In view of the above, there is a need to alleviate at least part of the inconveniences of the prior art.

In particular, there is a need to provide a method for controlling variable transmission ophthalmic lenses which enhances the comfort of the wearer when the ambient light varies abruptly.

PRESENTATION OF THE INVENTION

To this end, the present disclosure describes a method for controlling an optical transmission of a variable transmission ophthalmic lens, the method being implemented by a controlling unit and comprising:

receiving, from an ambient light sensor, values of a measured parameter related to an illuminance of the environment of the wearer, computing a change of illuminance from the values of the measured parameter during a predetermined time interval, comparing the computed change of illuminance with a first threshold, when the computed change of illuminance is greater than the first threshold, implementing a first command configured for varying the transmission of the variable transmission ophthalmic lens from an initial transmission value corresponding to a current transmission value to a first target transmission value, according to a first variation profile comprising a first phase during which the transmission overshoots the first target transmission value, and a second phase during which the transmission returns to the first target transmission value.

By ambient light sensor is understood any sensor that is sensitive to light, such as visible light, IR light or UV light, and that can measure an amount of said light.

By "parameter related to an illuminance of the environment of the wearer" is understood a level of light in a wavelength range that the ambient light sensor is sensitive to.

The illuminance of the environment of the wearer may be derived, or calculated, from the measured values of said parameter, for example by using a model of light emission spectrum related to a given source of light, for example a model of light emission spectrum of the sun.

By first threshold may be understood for example:

an absolute threshold, in other words the variation over time of a value of illuminance may be compared to an absolute value, or a relative threshold, in other words the variation over time of a value of illuminance may be divided by a value of an initial illuminance and the obtained ratio may be compared to an absolute value, or a variable threshold being a result of a function of an initial illuminance, in other words, the variable threshold may have a different value whether the ambient light is initially dim or bright.

It is considered that the initial transmission value of the ophthalmic lens is the transmission value at an initial instant at which the computed change of illuminance is compared to the first threshold.

It is considered that overshooting means exceeding the target, therefore, if the transmission is to increase up to the first target transmission value, then the transmission overshooting the first target transmission value means reaching a higher transmission value than the first target transmission value.

Conversely, if the transmission is to decrease to the first target transmission value, then the transmission overshooting the first target transmission value means reaching a lower transmission value than the first target transmission value.

It is considered that implementing the first command and implementing the second command correspond to applying a corresponding command signal which induces varying the transmission of the ophthalmic lenses. For example, the ophthalmic lenses may comprise one of a layer of electrochromics and a layer of liquid crystals placed between two command electrodes. Implementing the first command or the second command may involve applying a command signal to the command electrodes.

By providing a succession of an overshoot and of a return, the variation of transmission according to the first command allows:

cushioning a brutal variation of luminosity by quickly averting the wearer against the risk of immediate glare, then recovering some dynamic in transmission to get ready for a future brutal variation of luminosity while following the eye adaptation to the light and improving contrast.

By conditionally implementing the first command based on the comparison of the computed change of illuminance with a first threshold, the transmission of the ophthalmic lenses may be commanded with a dedicated variation profile to prevent an immediate risk of glare when the variations of illuminance are particularly quick.

In some examples, the method further comprises, when the absolute value of the computed change of illuminance is smaller than, or equal to, the absolute value of the first threshold, implementing a second command for varying the transmission of the variable transmission ophthalmic lens according to a monotonic variation profile.

This allows providing for example a classic variation profile as long as the variations of illuminance are slow enough, in order to smoothly adapt the transmission of the ophthalmic lens to the evolution of illuminance.

In some examples, the method further comprises, when the absolute value of the computed change of illuminance is smaller than, or equal to, the absolute value of the first threshold, maintaining the transmission value of the variable transmission ophthalmic lens at the initial transmission value.

This allows always providing the same transmission value as long as the speed of variation of illuminance does not exceed the first threshold, in order to avoid disturbing the wearer with unwanted variations of transmission. This may be useful for certain activities where the ambient illuminance usually remains around a constant low value, but may occasionally rise quickly to high values due to briefly crossing a major source of light.

In some examples, the method comprises, further to comparing the computed change of illuminance with a first threshold, comparing a current value of the measured parameter with a parameter threshold, then:

when the current value of the measured parameter is greater than the parameter threshold and the computed change of illuminance is greater than the first threshold, implementing the first command.

Moreover, the method may comprise, when the current value of the measured parameter is smaller than the parameter threshold, implementing a command configured for maintaining the transmission equal to the initial transmission value.

This is useful in particular for situations such as driving at night where the illuminance remains at a low absolute value, but where detected variations of illuminance may have a high relative value. In such situations where the wearer must not be disturbed, any command which would induce a change of transmission should be overridden, or should not be implemented, so that the transmission remains constant over time.

More generally, implementing or not the first command may be based on:

comparing a current value of the parameter related to the illuminance of the environment with a corresponding threshold, or on comparing a variation of said parameter over a time interval with another corresponding threshold, or on comparing a result of a function involving a combination of both the current value of the parameter and its variation over time with a corresponding threshold.

Such function may for example allow, in situations of low illuminance, maintaining the transmission at a predefined constant value, and in situations of high illuminance, controlling the transmission to vary over time according to a specific command selected based on a relative variation of illuminance over time.

In some examples, the method further comprises, when the absolute value of the computed change of illuminance is smaller than, or equal to, the absolute value of the first threshold, comparing the computed change of illuminance with a second threshold, then when the absolute value of the computed change of illuminance is greater than the absolute value of the second threshold, implementing a second command for varying the transmission of the variable transmission ophthalmic lens from the initial transmission value to a second target transmission value according to a monotonic variation profile, and when the absolute value of the computed change of illuminance is smaller than, or equal to, the absolute value of the second threshold, maintaining the transmission value of the variable transmission ophthalmic lens at the initial transmission value.

The ophthalmic lens may then controlled according to one of three different modes depending on whether the variation of illuminance is brutal (above the first threshold), normal (above the second threshold) or negligible.

In some examples, the first command comprises instructions for varying the transmission of the variable transmission ophthalmic lens over time according to a sum of a standard function and of an overshoot function, the standard function defining a monotonous variation of transmission from the initial transmission value to the first target transmission value, and the overshoot function defining the transmission overshoot value, a duration of the overshoot phase and a duration of the decay phase.

In some examples, the second command comprises instructions for varying the transmission of the variable transmission ophthalmic lens over time according to the standard function.

For example, the standard function may be a default function applied to all variations of transmission while the overshoot function may be applied on top of the standard function, as a result of implementing the first command signal, only in specific cases where the variation of illuminance is brutal.

In some examples, a different overshoot function is used depending on whether the sign of the computed change of illuminance is positive or negative.

This allows providing an improved comfort to the wearer. For example, the choice of an overshoot function may be adapted to physiological parameters of the wearer regarding, respectively, the adaptation to an increase and to a decrease of transmitted light.

In some examples, the first target transmission value is determined as a function of an illuminance.

For example, the first target transmission value may be determined as a function of the variation of illuminance having caused triggering the implementation of the first command.

In addition, the first target transmission value may be updated as a function of a further variation of illuminance, obtained after having triggered the implementation of the first command.

This allows determining the transmission value to be reached in order to compensate for the change in successive values of illuminance.

In some examples, the transmission overshoot value is determined as a function of a difference between the computed change of illuminance and the first threshold.

By overshooting the first target transmission value, the response time is minimized. It may be preferable to decrease even further the reaction time when the computed change of illuminance is greatly higher than the first threshold. This may be achieved by setting an even further transmission overshoot value.

In some examples, the method further comprises, after implementing the first command, the transmission function of the variable transmission ophthalmic lens having a temporary value, based on the received measurements, computing a further change of illuminance during a further time interval, comparing the computed further change of illuminance with the first threshold, when the absolute value of the computed further change of illuminance is greater than the absolute value of the first threshold, interrupting the transmission variation resulting of the first command and implementing a third command for varying the transmission of the variable transmission ophthalmic lens from the temporary transmission value to a third target transmission value, and when the absolute value of the computed further change of illuminance is smaller than, or equal to, the absolute value of the first threshold, proceeding with the transmission variation resulting of the first command.

This allows interrupting the transmission variation when the current illumination is detected to have returned closer to the initial value, thus removing the need for a quick response time to prevent glare.

In some examples, the second target transmission value corresponds to the initial transmission value.

This allows cancelling the first command and the associated transmission variation while underway.

In some examples, the first threshold is based on a physiological parameter of the wearer.

This allows providing a quick change of transmission upon detecting a change in the amount of detected light exceeding a threshold which is customized to each specific wearer. Therefore, the comfort of each specific wearer is optimized.

The present disclosure further describes a controlling unit configured for implementing the above method.

The present disclosure further describes a pair of eyeglasses intended to be worn by a wearer, the pair of eyeglasses comprising:

at least one variable transmission ophthalmic lens, an ambient light sensor configured to measure values of a parameter related to an illuminance of an environment, and the above controlling unit, coupled to the variable transmission ophthalmic lens and to the ambient light sensor.

The present disclosure further describes a computer program product comprising a series of instructions that, when they are executed by a processor, implements the above method.

The present disclosure further describes a non-transitory computer-readable storage medium, storing the above computer program.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF THE INVENTION

Figure 1:
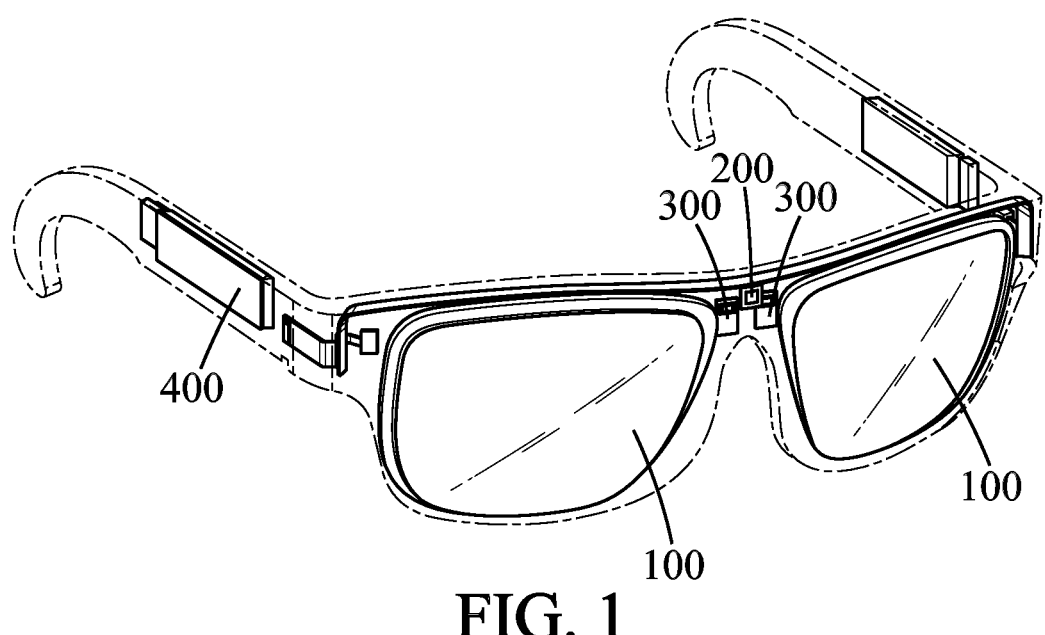
FIG. 1 illustrates an exemplary eyeglass device.

It is now referred to FIG. 1 which illustrates an exemplary eyeglass device.

The eyeglass device comprises:

a pair of variable transmission ophthalmic lenses (100) mounted on a spectacle frame, a light sensor (200) configured to sense a level of visible light, or an illuminance, incoming towards the lenses (100), and a controlling unit (300) coupled to the light sensor and to the lenses.

The eyeglass device may comprise one or more power sources (400) for providing electrical power to the lenses (100), to the light sensor (200) and to the controlling unit (300).

Each lens (100) has a transmission function which is, directly or indirectly, controllable by an electrical command signal.

For example, each lens (100) may comprise an electrochromic material, which visible light transmission properties are electrically switchable, for instance as a layer placed between two command electrodes. For example, each lens (100) may comprise a thermochromic material, which visible light transmission properties are thermally switchable, associated to an electrical conductor which temperature may be controlled by the passage of an electric current. More generally, each lens (100) may be based on any smart glass technology or combination thereof, such as electrochromic, thermochromic, photochromic, suspended-particle, microblind or polymer-dispersed liquid-crystal technologies.

Light sensors are photoelectric devices that converts light energy of visible light, detected by the device, to electrical energy. Examples include photoresistors, photodiodes, and phototransistors. The light sensor (200) may be mounted on the spectacle frame, such as on the nose bridge, on the lens mount, on a hinge, on an arm, etc. The eyeglass device may comprise one or more additional light sensors (200). For example, the eyeglass device may comprise a pair of identical light sensors (200), each mounted close to a corresponding ophthalmic lens, in order to sense separately the incoming light towards each of the eyeglasses (100). For example, the eyeglass device may comprise a plurality of light sensors (200), each being sensitive to different visible light wavelengths, in order to sense separately blue light and red light for example, in order to apply different control functions to the ophthalmic lenses depending on the spectrum of the incoming visible light.

The controlling unit (300) may comprise one or more processors operably coupled to one or more memories and to one or more communication interfaces with the lenses (100) and with the light sensor (200). Communication between the controlling unit, the lenses and the light sensor may be wired or wireless.

At an initial instant the eyeglass device being worn by a wearer, the lenses (100) each have an initial transmission value $T_i$. The initial transmission value $T_i$ may be preset in accordance with the illuminance of the environment at the initial instant. For example, in a bright environment, the initial transmission value $T_i$ may be preset to a low value, such as 20% or less, in order to dim the incoming light and protect the wearer from glare. For example, in a dark environment, the initial transmission value $T_i$ may be preset to a high value, such as 80% or more, in order to allow the incoming light to pass and enhance the comfort of the wearer.

Figure 2:
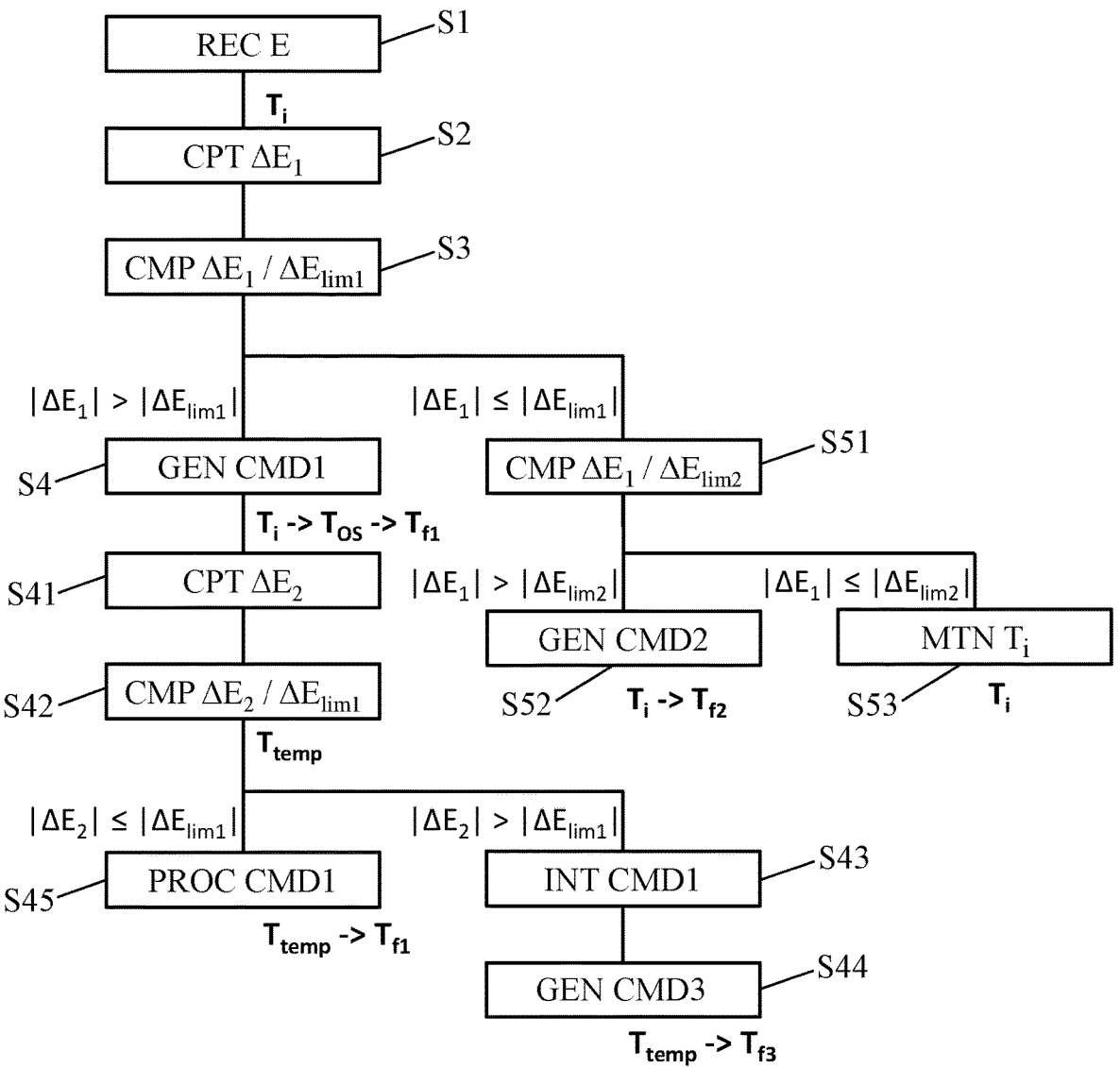
FIG. 2 depicts a flowchart of a general algorithm of an exemplary software for carrying out a proposed method for controlling the device of FIG. 1.

It is now referred to FIG. 2 which illustrates an algorithm of a software that may be stored on a memory and executed by a processor of the controlling unit (300) to carry out a method for driving the transmission of the lenses (100).

The controlling unit (300) obtains REC E (S1), from the light sensor (200), successive measurements of an illuminance of the environment of the wearer over time. The measurements may be collected for example at fixed time intervals dt, such as every second.

In the context of the disclosure, a measurement of the illuminance indicates a total quantity of incoming light energy, in a predetermined wavelength domain which the light sensor (200) may sense. The predetermined wavelength domain is specific to the light sensor (200) and corresponds to at least a portion of the visible light wavelength domain.

Each obtained measurement may be stored by the controlling unit as a time-stamped measurement indicating the illuminance of the environment of the wearer at the time of the measurement.

Based on the obtained measurements, the controlling unit (300) computes CPT $\Delta E_1$ (S2) a change of illuminance $\Delta E_1 = E_{cur} - E_i$ between an initial illuminance $E_i$ at the initial instant $t_i$ and a current illuminance $E_{cur}$ at a current instant $t_{cur}$. The time interval between the initial instant $t_i$ and the current instant $t_{cur}$ may comprise an integration time for filtering significant variations of illuminance from glitches.

The absolute value $|\Delta E_1|$ of the change of illuminance $\Delta E_1$ indicates the amplitude of the change.

The sign of the change of illuminance $\Delta E_1$ indicates whether the illuminance has increased (if the sign is positive) or decreased (if the sign is negative) between the initial instant $t_i$ and the current instant $t_{cur}$.

The controlling unit (300) compares CMP $\Delta E_1 / \Delta E_{lim1}$ (S3) the computed change of illuminance with a first threshold $\Delta E_{lim1}$.

The first threshold $\Delta E_{lim1}$ is a preset non-null value corresponding to a limit above which a change of illuminance is considered steep, or brutal.

The first threshold $\Delta E_{lim1}$ may be preset for example as an absolute value, or a computed value, for example as a relative value of the initial illuminance.

The first threshold $\Delta E_{lim1}$ may be preset for example based on physiological parameters of the wearer, such as sensitivity to glare, average contrast recovery time after glare, pupil size and kinetic.

The first threshold $\Delta E_{lim1}$ may be adjusted through interaction with the wearer, possibly based on artificial intelligence, machine learning, deep learning, supervised learning, etc.

In an example, the first threshold is different whether the change of illuminance $\Delta E_1$ is positive or negative. For instance, a positive value $\Delta E_{lim1+}$ and a negative value $\Delta E_{lim1-}$ of the first threshold may each be predetermined. Then, the first threshold $\Delta E_{lim1}$ may be selected as the predetermined value which sign matches the sign of the change of illuminance $\Delta E_1$.

Based on the result of the comparison, the processing circuit (300) controls the transmission of the lenses according to a different variation profile whether a detected change of illuminance is considered brutal or not.

More precisely, when the absolute value $|\Delta E_1|$ of the change of illuminance $\Delta E_1$ is greater than the absolute value $|\Delta E_{lim1}|$ of the first threshold $\Delta E_{lim1}$, the controlling unit (300) implements GEN CMD1 (S4) a first command for varying the transmission of the ophthalmic lenses (100).

The first command allows controlling the transmission of the ophthalmic lenses (100) from the initial transmission value $T_i$ to a first target transmission value $T_{f1}$, according to a variation profile comprising a succession of two phases, namely an overshoot phase during which the transmission overshoots the first target transmission value and a decay phase during which the transmission returns towards the first target transmission value.

On the contrary, the first command is not implemented when the absolute value $|\Delta E_1|$ of the change of illuminance $\Delta E_1$ is smaller than, or equal to, the absolute value $|\Delta E_{lim1}|$ of the first threshold $\Delta E_{lim1}$.

To sum up, upon detecting a change of illuminance, said change of illuminance is compared to a first threshold to detect if the change is brutal.

Then, in the case that the change of illuminance is brutal, a first command is implemented to vary the transmission of the ophthalmic lenses.

Otherwise, the first command is not implemented.

A possible further course of action is described thereafter in the case that the change of illuminance is smoother. It is thus considered, in this case, the following result of the comparison: the absolute value $|\Delta E_1|$ of the change of illuminance $\Delta E_1$ is smaller than, or equal to, the absolute value $|\Delta E_{lim1}|$ of the first threshold $\Delta E_{lim1}$.

The controlling unit (300) proceeds with comparing CMP $\Delta E_1 / \Delta E_{lim2}$ (S51) the computed change of illuminance with a second threshold $\Delta E_{lim2}$.

The second threshold $\Delta E_{lim2}$ is a preset non-null value which is lower than the first threshold $\Delta E_{lim1}$.

Similarly to the first threshold $\Delta E_{lim1}$, the second threshold $\Delta E_{lim2}$ may be a preset absolute or relative value, and may also be different depending on the sign of the computed change of illuminance.

The value of the second threshold $\Delta E_{lim2}$ may be related to a physiological parameter of the wearer, such as a perception threshold of the wearer.

For instance, the second threshold may correspond to a limit above which the detected change of illuminance is perceptible by the wearer and requires a compensation by adapting the transmission of the ophthalmic lenses.

Based on the result of the comparison, the processing circuit (300) may implement a second command and vary the transmission of the lenses.

More precisely, when the absolute value $|\Delta E_1|$ of the change of illuminance $\Delta E_1$ is greater than the absolute value $|\Delta E_{lim2}|$ of the second threshold $\Delta E_{lim2}$, the controlling unit (300) implements GEN CMD2 (S52) a second command for varying the transmission of the ophthalmic lenses (100).

The second command allows controlling the transmission of the ophthalmic lenses (100) from the initial transmission value $T_i$ to a second target transmission value $T_{f2}$, according to a variation profile not comprising any overshoot phase.

On the contrary, when the absolute value $|\Delta E_1|$ of the change of illuminance $\Delta E_1$ is smaller than, or equal to, the absolute value $|\Delta E_{lim2}|$ of the second threshold $\Delta E_{lim2}$, no command is implemented.

To sum up:

if the change of illuminance is brutal, then a first command is implemented to vary the transmission of the ophthalmic lenses, the first command implying overshooting a first target transmission value during an overshoot phase then returning towards the first target transmission value during a decay phase, if the change if illuminance is perceptible without being brutal, then a second command is implemented to vary the transmission of the ophthalmic lenses, the second command implying reaching a second target transmission value without overshooting said value, and if the change of illuminance is imperceptible, then no command is implemented and the value of the transmission of the ophthalmic lenses remains equal to the initial transmission value $T_i$.

Figure 3:
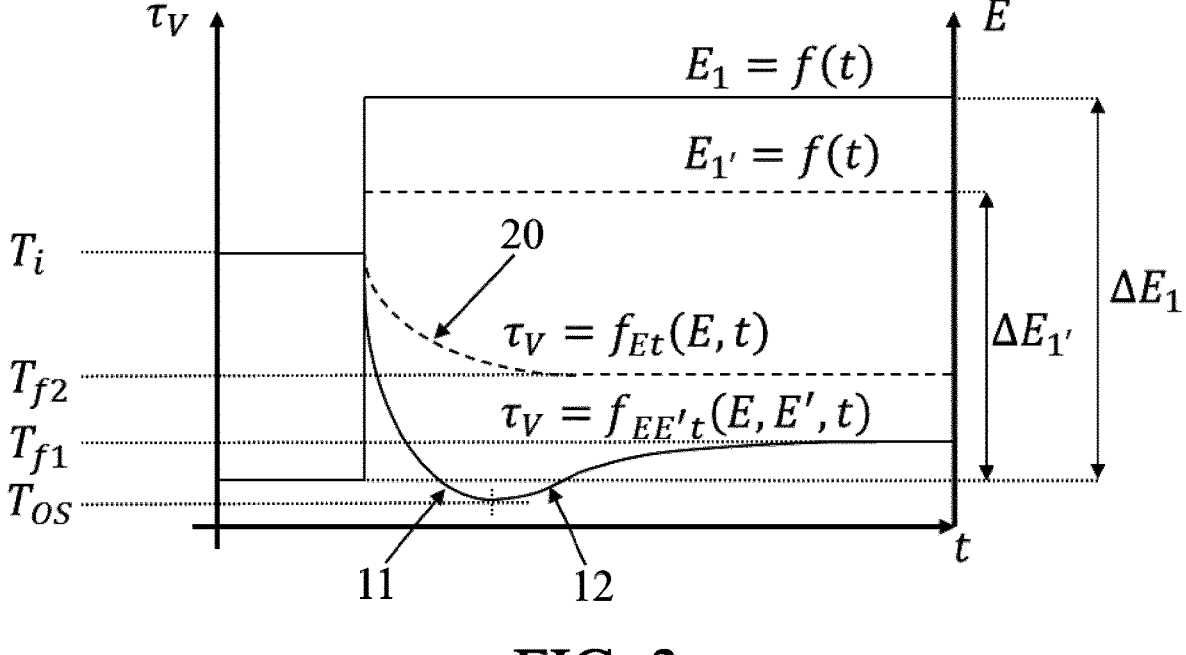
FIG. 3 depicts a superimposition of two variation profiles of a transmission function of a variable transmission ophthalmic lens according, respectively, to an exemplary first command and to an exemplary second command.

It is now referred to FIG. 3, which illustrates an exemplary illuminance as a function of time as a solid line labeled $E_1=f(t)$.

It is seen in this example that the level of light intensity varies, during a time interval, from an initial light intensity value to a first light intensity value. Said values may correspond for example to two successive measurements.

For simplicity's sake, the illumination E is considered to have two stable states during the considered period of time.

In this example, the first light intensity value is significantly greater than the initial light intensity value, resulting in a brutal light intensity increase during the time interval, thus to a positive value of $\Delta E_1$, greater than the absolute value of the first threshold $\Delta E_{lim1}$. As a result, a first command is implemented by the controlling unit (300).

A schematic representation of an exemplary transmission as a function of time according to a first variation profile which results of the implementation of such first command is represented on FIG. 3 as a solid line labeled $\tau_V=f_{EE'_l}(E, E',t)$.

According to the first variation profile, the transmission value of the ophthalmic lenses (100) varies from the initial transmission value $T_i$ to a first target transmission value $T_{f1}$. The first target transmission value $T_{f1}$ may for example be determined as a function of a measured illuminance, for instance as a function of the first light intensity value.

The first variation profile comprises a succession of two phases.

The first phase is an overshoot phase (11) from the initial transmission value $T_i$ to a transmission overshoot value $T_{OS}$ exceeding the first target transmission value $T_{f1}$.

Since in this example, the change of illuminance is positive, resulting in the first target transmission value $T_{f1}$ being smaller than the initial transmission value $T_i$, the transmission overshoot value $T_{OS}$ is smaller than the first target transmission value.

In another example, not represented, the change of illuminance is negative, resulting in the first target transmission value $T_{f1}$ being greater than the initial transmission value $T_i$. In this other example, the transmission overshoot value $T_{OS}$ is greater than the first target transmission value.

In both cases, the variation of transmission during the overshoot phase has the same sign as for attaining the first target transmission value, and a greater amplitude. Formally, $$\frac{T_{OS}-T_i}{T_{f1}-T_i} > 1.$$

The transmission overshoot value ($T_{OS}$) may be determined as a fixed offset from the first target transmission value $T_{f1}$. Alternatively, such offset may be determined as a function of a difference between the computed change of illuminance $\Delta E_1$ and the first threshold $\Delta E_{lim1}$.

Reaching the transmission overshoot value $T_{OS}$ corresponds to reaching an inflexion point on the variation profile and marks the start of the second phase.

The second phase is a decay phase (12) from the transmission overshoot value $T_{OS}$ to the first target transmission value $T_{f1}$. From what precedes, the variation of transmission during the decay phase (12) has a sign opposite to that during the overshoot phase (11).

The duration of the decay phase may be one or two orders of magnitude greater than the duration of the overshoot phase. For instance, if the overshoot phase lasts a few seconds, the subsequent decay phase may last about a few minutes.

This succession of the overshoot phase and of the decay phase allows:

cushioning a brutal variation of luminosity by quickly averting the wearer against the risk of immediate glare, then recovering some dynamic in transmission to get ready for a future brutal variation of luminosity while following the eye adaptation to the light and improving contrast.

In some embodiments, the first variation profile may be represented as the sum of a standard function and of an overshoot function, the standard function defining a monotonous variation of transmission from the initial transmission value $T_i$ to the first target transmission value $T_{f1}$, and the overshoot function defining the transmission overshoot value $T_{OS}$, a duration of the overshoot phase (11) and a duration of the decay phase (12).

Formally, this equates to $\tau_V=f_{EE'_l}(E,E',t)=f_{E_l}(E,t)+h(E,E', t)$, with $h(E,E',t)$ being a boost function divided in two parts: an overshoot period followed by a decay period.

$h(E,E',t)$ may depend (in time, in intensity, in shape . . . ) on the wearer and on some of its specific physiological parameters (ie: sensitivity to glare, average contrast recovery time after glare, pupil size and kinetic, or else) and may be adjusted through interaction with the wearer using AI, machine learning, deep learning, supervised learning, or else.

$h(E,E',t)$ may be different depending on the sign of the variation of light intensity, so that different overshoot managements are implemented for darkening and for bleaching.

Regarding the overshoot period, $h(E,E',t)$ may tend to zero when the first derivative E' of the light intensity over time tends to zero, meaning that the amplitude of the overshoot is minimized when the speed of variation of the light intensity is contained.

The duration of the overshoot period may be predetermined so that the decay period occurs at expiration of a specific time interval.

The duration of the overshoot period may be predetermined based on specific rules, such as management rules specific to class 4 eyewear in a driving situation for example, and/or according to the amplitude of the change of illuminance $\Delta E_1$ and/or according to previous values of transmission of the ophthalmic lenses (100) prior to detecting the change of illuminance $\Delta E_1$ and/or according to physical limitations of the eyewear, such as the maximal possible bleaching or darkening speed of the ophthalmic lenses (100).

Regarding the decay period, h(E,E',t) may tend to zero at an infinite time, meaning that the transmission of the ophthalmic lenses evolves towards the first target transmission value $T_{f1}$. The shape of the decay phase may be of a linear type, of an exponential type, of an arctan type, or else.

An alternate exemplary illuminance as a function of time is illustrated on FIG. 3 as a discontinued line labeled $E_1 = f(t)$.

In this example, a smoother light intensity increase is detected during the time interval, resulting in a positive value of $\Delta E_1$, which is greater than the absolute value of the second threshold $\Delta E_{lim2}$, but smaller than the absolute value of the first threshold $\Delta E_{lim1}$. As a result, a second command is implemented by the controlling unit (300).

An exemplary transmission as a function of time according to a second variation profile which results of the implementation of such second command is represented on FIG. 3 as a discontinued line labeled $\tau_V = f_{Ef}(E,t)$.

According to the second variation profile, the transmission value of the ophthalmic lenses (100) varies from the initial transmission value $T_i$ to a second target transmission value $T_{f2}$ without overshooting said second target transmission value $T_{f2}$.

For example, the second variation profile may consist of a single monotonic phase (20) according to a standard function defining a monotonous variation of transmission from the initial transmission value $T_i$ to the second target transmission value ($T_{f2}$).

Such a variation profile allows following the eye adaptation to the light without any brutal variation in transmission since there is no risk of immediate glare.

Therefore, thanks to the selective implementation of the first command and of the second command, it is possible to always provide to the wearer a variation of transmission which is adapted to the current speed of variation of the ambient light intensity.

In exemplary embodiments, it may be possible to interrupt the implementation of the first command. Triggering such an interruption may be based on a predefined criterion related to detecting a further evolution of the ambient light intensity.

In an example, the light sensor (200) performs repeated measurements of the ambient light intensity over time and transmits the measurements to the processing circuit (300). It is further considered in this example that an increase in ambient light intensity from an initial value to a first, greater, value has been detected. It is further considered that the processing circuit (300) has determined that the detected increase exceeds a first threshold. As a result, an implementation of a first command has been triggered.

In this example, it is considered that, at a current instant:

the implementation of the first command is in progress, the transmission of the ophthalmic lenses (100) has a temporary value, and a further measurement of the ambient light intensity by the light sensor (200) is obtained by the processing circuit (300) and indicates a second value.

Based on the second value, it is possible to either confirm that the change of illuminance from the initial value is brutal or, on the contrary, indicate that the first value reflects merely a brief, transient, state, and that the change of illuminance from the initial value to the second value is actually not brutal.

To do so, the processing circuit may be further configured to compute CPT $\Delta E_2$ (S41) the difference $\Delta E_2$ between initial value and the second value of light intensity.

The processing circuit may be further configured to compare CMP $\Delta E_2 / \Delta E_{lim1}$ (S42) the computed difference $\Delta E_2$ with the first threshold $\Delta E_{lim1}$.

The result of the comparison indicates whether the change of light intensity between the initial value and the second value is brutal or not.

Then, based on the result of the comparison, the processing circuit (300) may either proceed with the implementation of the first command or interrupt the implementation of the first command.

More precisely, when the absolute value $|\Delta E_2|$ of the change of illuminance $\Delta E_2$ is greater than the absolute value $|\Delta E_{lim1}|$ of the first threshold $\Delta E_{lim1}$, the controlling unit (300) proceeds PROC CMD1 (S45) with the implementation of the first command for varying the transmission of the ophthalmic lenses (100).

In such a case, both the variation of light intensity from the initial value to the first value and the variation of light intensity from the initial value to the second value exceed the first threshold. It is thus confirmed that the variation of light intensity is brutal and requires an immediate adaptation of the transmission of the ophthalmic lenses (100) to prevent glare.

On the contrary, when the absolute value $|\Delta E_2|$ of the change of illuminance $\Delta E_2$ is smaller than, or equal to, the absolute value $|\Delta E_{lim1}|$ of the first threshold $\Delta E_{lim1}$, the controlling unit (300) interrupts INT CMD1 (S43) the implementation of the first command for varying the transmission of the ophthalmic lenses (100).

In such a case, the variation of light intensity from the initial value to the second value does not exceed the first threshold, and is not considered brutal. As a consequence, the variation of transmission of the ophthalmic lenses (100) may be performed without an overshoot.

In such a case, the controlling unit (300) further generates GEN CMD3 a third command (S44) for varying the transmission of the ophthalmic lenses (100) from the temporary transmission value to a third target transmission value.

The third target transmission value is determined based on the second value of light intensity. For example, if the absolute value $|\Delta E_2|$ of the change of illuminance $\Delta E_2$ is smaller than, or equal to, the absolute value $|\Delta E_{lim2}|$ of the second threshold $\Delta E_{lim2}$, then this means that the change of illuminance $\Delta E_2$ does not require a variation of transmission from the initial value. In such a case, the third target transmission value is set at the initial transmission value $T_i$.

The invention claimed is:

1. A method for controlling an optical transmission of a variable transmission ophthalmic lens, the method being implemented by control circuitry and comprising:

receiving, from an ambient light sensor, values of a measured parameter related to an illuminance of an environment of a wearer;

computing a change of illuminance from the values of the measured parameter during a predetermined time interval;

comparing the computed change of illuminance with a first threshold; and when the computed change of illuminance is greater than the first threshold, implementing a first command configured to vary the transmission of the variable transmission ophthalmic lens from an initial transmission value corresponding to a current transmission value to a first target transmission value, the first command being varied according to a first variation profile including a first phase during which the transmission overshoots the first target transmission value, and a second phase during which the transmission returns to the first target transmission value, wherein the method further comprises, when the absolute value of the computed change of illuminance is smaller than, or equal to, the absolute value of the first threshold, implementing a second command configured to vary the transmission of the variable transmission ophthalmic lens according to a monotonic variation profile.

2. The method according to claim 1, wherein the first command includes instructions for varying the transmission of the variable transmission ophthalmic lens over time according to a sum of a standard function and of an overshoot function, the standard function defining a monotonous variation of transmission from the initial transmission value to the first target transmission value, and the overshoot function defining the transmission overshoot value, a duration of an overshoot phase and a duration of a decay phase.

3. The method according to claim 1, wherein the first command includes instructions for varying the transmission of the variable transmission ophthalmic lens over time according to a sum of a standard function and of an overshoot function, the standard function defining a monotonous variation of transmission from the initial transmission value to the first target transmission value, and the overshoot function defining the transmission overshoot value, a duration of an overshoot phase and a duration of a decay phase, wherein the second command comprises instructions for varying the transmission of the variable transmission ophthalmic lens over time according to the standard function.

4. The method according to claim 2, wherein a different overshoot function is used depending on whether the sign of the computed change of illuminance $\Delta E1$ is positive or negative.

5. The method according to claim 1, wherein the first target transmission value Tf1 is determined as a function of an illuminance.

6. The method according to claim 1, wherein the transmission overshoot value is determined as a function of a difference between the computed change of illuminance and the first threshold.

7. The method according to claim 1, further comprising, after implementing the first command, the transmission function of the variable transmission ophthalmic lens having a temporary value, based on the received measurements, computing a further change of illuminance during a further time interval, comparing the computed further change of illuminance with the first threshold, when the absolute value of the computed further change of illuminance is greater than the absolute value of the first threshold, interrupting the transmission variation resulting of the first command and implementing a third command for varying the transmission of the variable transmission ophthalmic lens from a temporary transmission value to a third target transmission value, and when the absolute value of the computed further change of illuminance is smaller than, or equal to, the absolute value of the first threshold, proceeding with the transmission variation resulting of the first command.

8. The method according to claim 1, wherein the first threshold is based on a physiological parameter of the wearer.

9. An apparatus comprising:

control circuitry configured to control an optical transmission of a variable transmission ophthalmic lens by being configured to:

receive, from an ambient light sensor, values of a measured parameter related to an illuminance of an environment of a wearer, compute a change of illuminance from the values of the measured parameter during a predetermined time interval, compare the computed change of illuminance with a first threshold, when the computed change of illuminance is greater than the first threshold, implement a first command configured to vary the transmission of the variable transmission ophthalmic lens from an initial transmission value corresponding to a current transmission value to a first target transmission value, the first command being varied according to a first variation profile including a first phase during which the transmission overshoots the first target transmission value, and a second phase during which the transmission returns to the first target transmission, and when the absolute value of the computed change of illuminance is smaller than, or equal to, the absolute value of the first threshold, implement a second command configured to vary the transmission of the variable transmission ophthalmic lens according to a monotonic variation profile.

10. A pair of eyeglasses intended to be worn by a wearer, the pair of eyeglasses comprising:

at least one variable transmission ophthalmic lens;

an ambient light sensor configured to measure values of a parameter related to an illuminance of an environment; and control circuitry coupled to the variable transmission ophthalmic lens and to the ambient light sensor, the control circuitry being further configured to control circuitry configured to control an optical transmission of a variable transmission ophthalmic lens by being configured to:

receive, from an ambient light sensor, values of a measured parameter related to an illuminance of the environment of the wearer, compute a change of illuminance from the values of the measured parameter during a predetermined time interval, compare the computed change of illuminance with a first threshold, when the computed change of illuminance is greater than the first threshold, implement a first command configured to vary the transmission of the variable transmission ophthalmic lens from an initial transmission value corresponding to a current transmission value to a first target transmission value, the first command being varied according to a first variation profile including a first phase during which the transmission overshoots the first target transmission value, and a second phase during which the transmission returns to the first target transmission, and when the absolute value of the computed change of illuminance is smaller than, or equal to, the absolute value of the first threshold, implement a second command configured to vary the transmission of the variable transmission ophthalmic lens according to a monotonic variation profile.

11. A non-transitory computer-readable storage medium, storing a computer program that when executed by the computer causes the computer to implement the method according to claim 1.

* * * * *